United States Patent [19]

Belart

[11] Patent Number: 4,586,591
[45] Date of Patent: May 6, 1986

[54] PRESSURE-FLUID-OPERABLE VEHICLE BRAKE SYSTEM

[75] Inventor: Juan Belart, Walldorf, Fed. Rep. of Germany

[73] Assignee: ITT Industries, Inc., New York, N.Y.

[21] Appl. No.: 659,302

[22] Filed: Oct. 9, 1984

[30] Foreign Application Priority Data

Oct. 21, 1983 [DE] Fed. Rep. of Germany ....... 3338322
Oct. 22, 1983 [DE] Fed. Rep. of Germany ....... 3338514

[51] Int. Cl.[4] .................. B60T 8/00; B60T 11/20; B60T 13/14; F15B 7/08
[52] U.S. Cl. ........................... 188/358; 60/550; 60/547.1; 91/519; 137/627.5; 137/630.16; 137/630.17; 188/345; 303/84 R; 303/92; 303/114; 303/119
[58] Field of Search ............. 303/114, 113, 119, 84, 303/50–56, 92, 10–12, 100, 117, 13–15, 63, 116; 60/550, 582, 581, 547.1, 579, 545; 91/519; 137/508, 602, 606, 605, 627.5, 630.16, 630.17; 251/63, 63.4, 63.5, 63.6; 188/345, 151 A, 358, 359, 181

[56] References Cited

U.S. PATENT DOCUMENTS 3,105,508 10/1963 Bowditch et al. ........... 137/627.5 X
3,273,589 9/1966 Dollison et al. ............. 137/627.5 X
3,306,043 2/1967 Kellogg et al. ..................... 60/550
3,345,998 10/1967 Dotto ............................. 303/84 R X
3,910,643 10/1975 Kobashi et al. ..................... 303/114
4,077,674 3/1978 Doto ........................... 137/627.5 X
4,090,533 5/1978 Harries ........................... 137/627.5
4,159,755 7/1979 Kang et al. ................... 303/84 A X
4,205,784 6/1980 Monigold .................... 137/627.5 X
4,523,791 6/1985 Belart et al. ..................... 303/114 X Primary Examiner—Douglas C. Butler
Attorney, Agent, or Firm—James B. Raden; William J. Michals

[57] ABSTRACT

A pressure-fluid-operable vehicle brake system is proposed, which is fed by an auxiliary energy supply system (3) and which comprises a master cylinder device (1), in which a booster piston (40) adapted to be acted upon by the auxiliary energy is slidable in a pressure fluid chamber (26). When the auxiliary energy supply system (3) is intact, the booster piston (40) comprises an effective area for the pressurization of a wheel brake cylinder which is larger than an effective area which results upon failure of the auxiliary energy supply system. Upon failure of the auxiliary energy supply system (3), the necessary deacceleration is achieved because of a smaller effective area at the booster piston (40) and at a greater displacement travel of the booster piston (40) and with less pedal force (F).

3 Claims, 2 Drawing Figures

PRESSURE-FLUID-OPERABLE VEHICLE BRAKE SYSTEM

BACKGROUND OF THE INVENTION

This invention relates to a pressure-fluid-operable vehicle brake system which is fed by an auxiliary energy supply system and including a master cylinder device in which a booster piston is slidably disposed.

In such known vehicle brake systems, the booster piston comprises an effective area for the pressurization of a wheel brake cylinder which area remains unchanged in the event of failure of the auxiliary energy supply system. It is a disadvantage that a very high force must be applied on the brake pedal in order to obtain the required deacceleration when the auxiliary energy supply system has failed.

It is a object of the present invention to improve upon a pressure-fluid-operable vehicle brake system of the type initially referred to such that the required deacceleration is reliably attained or exceeded by the application of lower force on the brake pedal.

SUMMARY OF THE INVENTION

This object is achieved by the present invention in that the booster piston includes the auxiliary energy supply system intact, an effective area for the pressurization of a wheel brake cylinder which is larger than the effective area provided at the booster piston upon failure of the auxiliary energy supply system. It is thus possible on failure of the auxiliary energy supply system to brake by applying lower pedal force because of a smaller effective area at the booster piston and, hence, a larger displacement travel of the booster piston and of the brake pedal.

In one embodiment a pedal-actuatable brake valve assembly located in front of the master cylinder device is provided for the delivery of auxiliary energy out of the auxiliary energy supply system, that pressure fluid can enter the pressure fluid chamber via a check valve device, that the master cylinder device accommodates a first and a second chamber which are confined by housing parts and by zones of the booster piston and which are interconnectable via a valve, that is open in the unpressurized state and is governed by the pressure controlled by the brake valve assembly, wherein on establishment of such connection on displacement of the booster piston a first portion of a pressure fluid volume is displaced from the first chamber into the second chamber, while the second portion of the pressure fluid volume is displaced by way of the check valve device into the pressure fluid chamber which communicates with a wheel brake cylinder, and wherein a connection is established between both chambers and the pressure fluid reservoir when the auxiliary energy supply system has failed. The master cylinder device can be designed as tandem master cylinder device with two pressure fluid chambers and with a floating piston disposed between the two pressure fluid chambers.

It is particularly advantageous to insert electromagnetically actuatable valves into the brake lines connected to the master cylinder device for the purpose of brake lock control of the wheel brake cylinders which are connectable to a return line leading to the pressure fluid reservoir. Upon a failure of any one of the brake circuits, the brake lock control will remain fully operable in the still intact circuit according to the invention.

A straightforward and expedient design is accomplished by the connection of both chambers to the pressure fluid reservoir by way of a two-way/two-position control valve which is open in the unpressurized state and which is governed by the dynamic pressure.

The present invention also provides a valve assembly comprising: a first valve device which is composed of a valve seat element slidable pressure-responsively between stops and including an assigned spring-biased valve closure member, and which controls the connection between a first pressure fluid chamber and a second pressure fluid chamber; a second valve device which is composed of a control element, that is pressure-responsively movable into abutment on a stop and includes a valve closure member arranged thereat, and of an assigned valve seat formed fast with the housing, the said second valve device controlling the connection between the second pressure fluid chamber and a third pressure fluid chamber; a first compression spring clamped in between housing and valve seat element; a second compression spring clamped in between valve seat element and control element; and, an extension of the control element projecting through the valve seat.

In this arrangement, the travel of displacement $S_1$, which the control element performs until its valve closure member abuts on the valve seat formed fast with the housing, is less than the distance $S_2$ between the extension and the closure member of the first valve device bearing against the stop.

Furthermore, after displacement of the first valve device by $S_3$ in the direction of the extension of the control element, there is a distance between extension and valve closure member if the control element abuts on the stop, and the valve closure member is pushed open by the extension when the control element abuts on the valve seat formed fast with the housing. In a particularly favorable manner, upon circuit failure, pressure fluid under dynamic pressure is prevented from flowing into the defect circuit while, when the brake circuits are intact, pressure fluid under dynamic pressure is able to flow into the pressure fluid chambers of the tandem master cylinder section. The valve assembly is designed as a double valve assembly.

BRIEF DESCRIPTION OF THE DRAWING

The present invention will be described in greater detail with reference to the accompanying drawing wherein.

DETAILED DESCRIPTION

Figure 1:
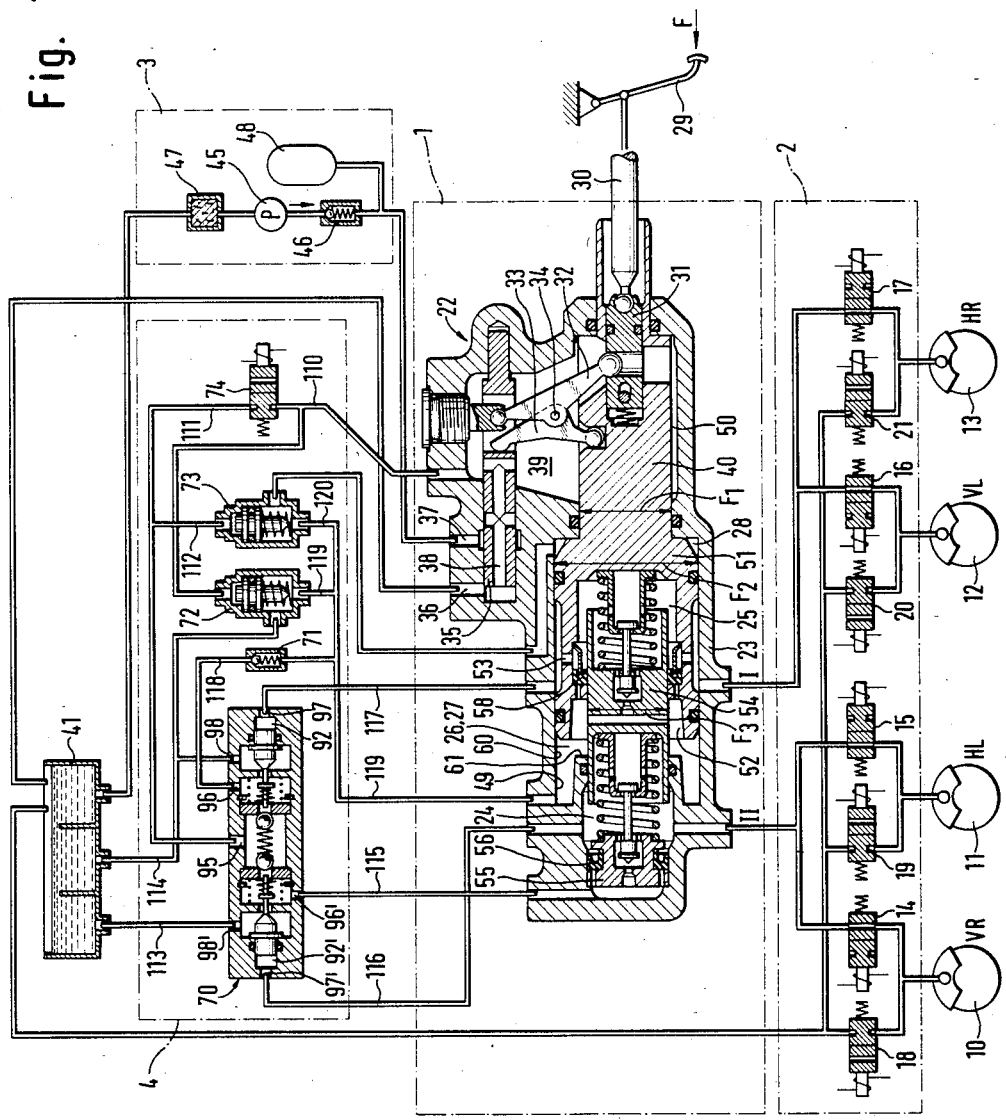
FIG. 1 shows an inventive brake slip control apparatus of a dual-circuit brake system with power brake booster; and, FIG. 2 shows a detail of FIG. 1 in an enlarged view.

The automotive vehicle brake slip control apparatus illustrated in FIG. 1 comprises a hydraulic unit 1, a valve block 2, an auxiliary energy supply system 3 and another valve block 4. The valve block 2 comprises the electromagnetically operated, normally opened pressure-supplying valves 14, 15, 16, 17 (so-called SO-valves) and the normally closed pressure-decreasing valves 18, 19, 20, 21 (so-called SG-valves), the said valves being assigned to each one wheel brake cylinder of the wheels 10, 11, 12 13 and illustrated herein symbolically (two-way/two-position control valves). In the embodiment shown, the wheel brake cylinders of the right front wheel 10 and of the left rear wheel 11 and those of the left front wheel 12 and of the right rear wheel 13 are jointly connected to one brake circuit I and II, respectively. The sensors for measuring the wheel velocity which are still required for brake slip control apparatuses and the electronics for generating the control signals for the valves 14 to 21 are not illustrated herein.

Essentially, the hydraulic unit is composed of a brake valve 22, a tandem master cylinder section 23 with two pressure chambers 24, 25 and another pressure fluid chamber 26 which latter consists of a first chamber 27 and a second chamber 28.

In the embodiment of the invention described herein, the brake valve 22 is designed as a compact hydraulic power brake booster. Upon depression of the brake pedal 29, the pedal force F will be transmitted in a fashion known per se via a push rod 30 and a push rod piston 31 onto an arrangement which is composed of two levers 32, 33 articulated to one another by means of a bolt 34 and from said arrangement onto the control piston 35 of the brake valve 22. Since the force that is required to displace the booster piston 40 of the brake valve 22 is considerably higher than that required to displace the control piston 35, at first, when the lever 32 is turned in its joint 34 by application of the force F, the control piston 35 will be shifted to the left (when viewing FIG. 1) so that the auxiliary energy source 3 will be connected to the booster chamber 39 through the inlet 37 and the inner bore 38 in the control piston 35. Shortly before this action, the opening 36 was closed via which the booster chamber 39 communicates with a pressure-compensating and supply reservoir 41 when the brake is not applied. The pressure developing in the pressure chamber 39 displaces the booster piston 40 to the left; simultaneously, the push rod piston 31 is force-applied to the right due to its effective area.

The auxiliary energy supply system 3 consists substantially of a pump 45 driven by an electric motor with the associated check valve 46 closing the direction of the pump 45, of a dirt filter 47 as well as of a pressure accumulator 48 which is connected to the supply reservoir 41, by way of a relief valve in a non-illustrated fashion. The pressure in the pressure accumulator 48 and in the auxiliary energy supply system 3, respectively, is monitored with the aid of two pressure alarm switches. One of these is set to an upper pressure threshold value; and being below this threshold value is indicative of an error in the auxiliary energy supply system, in the chambers connected thereto or in the static circuits, in which event, however, braking with slip control is still possible as long as the other switch that is set to a lower pressure threshold value has not yet responded.

The pressure fluid chambers 24, 25. 26, 27 and 28 are arranged in the tandem master cylinder section 23 of the hydraulic unit 1 and are confined by the booster piston 40, a piston 55 formed fast with the housing, a floating piston 54 as well as the housing walls in a fashion described in more detail hereinbelow.

The booster piston 40 is of stepped design and penetrates with a portion 50 of smaller diameter (effective area $F_1$) a wall of the housing of the hydraulic unit 1 in a sealed manner and is with a portion of larger diameter 51 (effective area $F_2$) sealedly slidable in a stepped housing bore 49 shaped in the housing of the hydraulic unit 1 in the tandem master cylinder section 23. In the inactive position of the system shown in FIG. 1, the shoulder of the booster piston 40 formed by the step is in abutment on the wall of the housing.

The pressure fluid chamber 25 which is in communication with the outlet of the first brake circuit I is designed in an axial recess 52, open on one side, of the larger portion 51 of the booster piston 40 and is closed by a slidable floating piston 54 (effective area $F_3$) which is sealedly arranged in the end zone of the recess 52; the sleeve 58 designed as a check valve device prevents that pressure fluid flows out of the pressure fluid chamber 25, but permits its flow into this chamber. The connection to the outlet of the brake circuit I will be constituted via a radial bore 53 and a circumferential groove in the booster piston 40.

The pressure fluid chamber 24 which is in communication with the outlet of the second brake circuit II is confined peripherally by the inner wall of a smaller portion of the stepped housing bore 49, is at its one end face sealedly closed by a piston 55 formed fast with the housing and is at its other end face sealedly closed by the slidable floating piston 54; the sealed diameters of piston 55 and floating piston 54 correspond to one another.

The end face of the piston 55 remote from the pressure fluid chamber 24 is adapted to be acted upon by pressure fluid. At the periphery of the piston 55, there is provided a check valve device in the form of a sleeve 56 opening towards the pressure fluid chamber.

The floating piston 54 does not comprise a step so that the end faces (effective areas $F_3$) which project into the pressure fluid chambers 24 and 25 are of equal amount.

The first chamber 27 of the pressure fluid chamber 26 is formed between the inner wall of the larger-diameter portion 60 of the housing bore 49, the end face of the larger portion of the booster piston (effective area $F_2-F_3$), a housing shoulder 61 and the outer periphery of the floating piston 54.

The second chamber 28 of the pressure fluid chamber 26 is formed between the inner wall of the larger-diameter portion 60 of the housing bore 49, the shoulder at the step of the booster piston 40, the wall of the housing opposite thereto and the outer periphery of the smaller portion of the booster piston 40.

The first chamber 27 of the pressure fluid chamber 26 is hydraulically connectable with the second chamber 28 by way of a line, as will be described in more detail hereinbelow.

Figure 2:
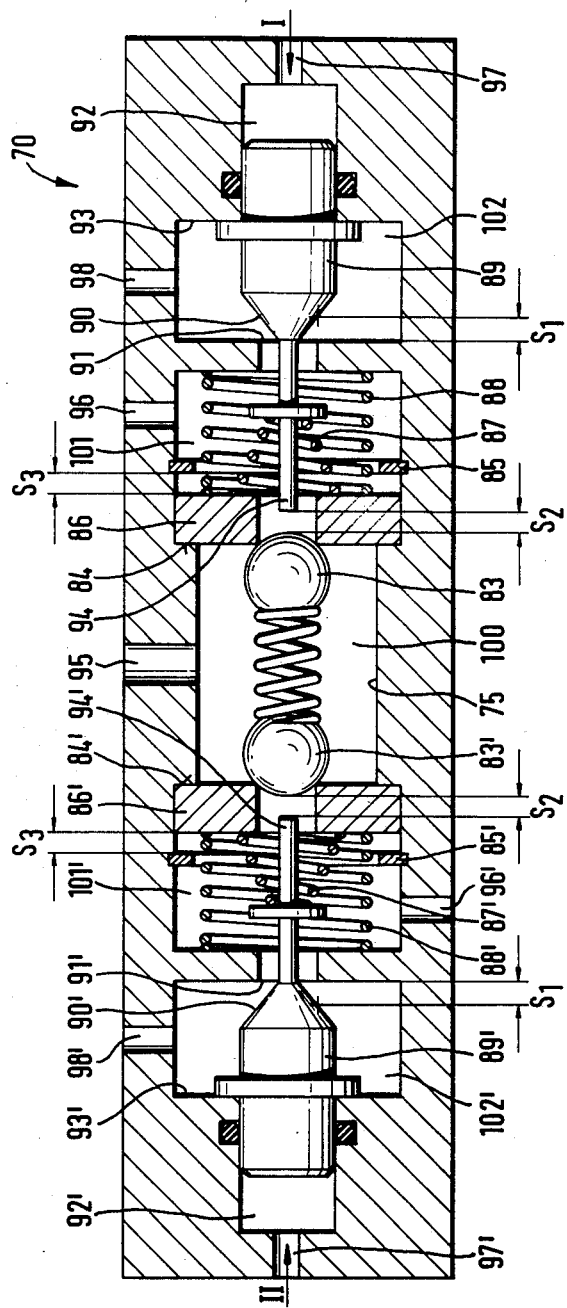

The valve block 4 comprises a hydraulically controllable double valve assembly 70, which is shown in more detail in FIG. 2, a check valve 71, two hydraulically controllable two-way/two-position control valves 72 and 73 as well as an electromagnetically actuated two-way/two-position valve 74 that is governed jointly with the control of the pressure-supplying and the pressure-decreasing valves 14 to 21.

The double valve assembly 70 is of symmetric design; starting from the plane of symmetry, a housing bore 75 that is stepped several times accommodates in each case: a first valve member 83, 83' in the shape of a ball which is acted upon by the force of a compression spring common to both members, a valve seat element 86, 86' that is slidable within limits in the housing between stops 84, 85 and 84', 85', respectively, that is sealed relative to the housing wall and contains a centric valve passage, compression springs 87, 88 and 87', 88', respectively, as well as a control element 89, 89', whereat a second valve closure member 90, 90' is arranged which is assigned to a valve seat 91, 91' formed fast with the housing.

The valve seat element 86, 86' is urged by the force of the compression spring 88, 88' supported at the housing in the direction of its assigned valve closure member 83, 83' that means inwardly in the direction of the plane of symmetry when viewing FIG. 2. Bearing against the valve seat element 86, 86' is the compression spring 87, 87' which bears with its other end against the control element 89, 89'.

The control element 89, 89' comprises an end face that is arranged sealedly in an outwardly disposed pressure chamber 92, 92'; the diameter of said end face is larger than the diameter of the valve seat 91, 91'. In the absence of pressure in the pressure fluid chamber 92, 92', the control element 89, 89' is maintained in abutment on a stop 93, 93' formed fast with the housing on account of the force of the compression spring 87, 87'; in this position, the valve closure member 90, 90' is spaced a distance $S_1$ from the valve seat 91, 91' formed fast with the housing. The control element 89, 89' penetrates the valve seat 91, 91' with an extension 94, 94' which is movable to bear against the valve closure member 83, 83'. If, on the one hand, the control element 89, 89' is in abutment on the stop 93, 93' and, on the other hand, the valve seat element 86, 86' is in abutment on the stop 84, 84', the extension 94, 94' is at a distance $S_2$ from the valve closure member 83, 83'; this is true also if, in contrast thereto, the valve seat element 86, 86' is bearing against the stop 85, 85' after having displaced by $S_3$; the distance $S_2$ has merely decreased. When the valve element 86, 86' is in abutment on the stop 85, 85' after having displaced by $S_2$ and the valve closure member 90, 90' is in abutment on the valve seat 91, 91', the valve closure member 83, 83' will be hindered by the extension 94, 94' to abut on the associated valve seat elements 86, 86' and hence will be hindered to close the valve passage.

Pressure fluid ports 95, 96, 96', 97, 97', 98, 98' terminate into the housing bore 75. The pressure fluid port 95 terminates into the pressure fluid chamber 100 formed between the two valve seat elements 86, 86'. The pressure fluid port 96, 96' ends into the pressure fluid chamber 101, 101' between the two valve passages. The pressure fluid port 97, 97' terminates into the pressure fluid chamber 92, 92' and the port 98, 98' ends into the pressure fluid chamber 102, 102' which is adapted to be closed by the valve closure member 90, 90'.

The function of the double valve assembly 70 will now be described. The hydraulic unit 1 is in communication with the valves of the valve block 2 as follows:

From the pressure chamber 39 of the brake valve 22, a line 110 leads directly to the control pressure port of the directional control valve 72 and to the one port of the directional control valve 74; from the other port of the directional control valve 74, the line 110 with line portions 111, 112 leads to the pressure fluid port 95 of the double valve assembly 70 and to the control pressure port of the directional control valve 73.

The pressure fluid ports 98, 98' of the double valve are connected to the supply reservoir 41 via lines 113 and 114; the one port of the directional control valve 72 communicates via the line 114 with the supply reservoir 41. The pressure fluid port 96' is via a line 115 connected to the end face of the piston 55 that is remote from the pressure fluid chamber 24. The pressure fluid port 97' leads via a line 116 to the pressure fluid chamber 24, while the pressure fluid port 97 is via the line 117 connected to the pressure fluid chamber 25.

A line 118 extends from the port 96 via the check valve 71 to the line 119 which is connected to the other port of the directional control valve 72 and to the first chamber 27 of the pressure fluid chamber 26. Branching off from the line 119 is a line 120 which, governed by the directional control valve 73, is connectable to the second chamber 28 of the control chamber 26. Interposed between the two ports of the directional control valve 72 is a check valve 71 which prevents pressure fluid flow from the line 119 to the line 118.

In the system's inactive position, the opening in the central valve of the pressure chamber 24 is in communication with the supply reservoir 41 via the line 115, the pressure fluid port 96', the open valve passage 90', 91', the pressure fluid port 98' and the line 113; the opening in the central valve of the pressure chamber 25 communicates with the supply reservoir 41 via the chamber 27, the line 119, the open valve passage of the valve 72 and the line 114.

The function of the inventive brake slip control apparatus will now be described. A braking action shall be considered taking place without slip control first;

Upon depression of the brake pedal 29, a dynamic pressure will be built up in the booster chamber 39 via a control piston 35, which pressure acts upon the booster piston 40 and displaces said to the left, when viewing FIG. 1. The pressure in the booster chamber 39 propagates via the line 110 to the control pressure chamber of the directional control valve 72, on the one hand, and closes said, while it is fed, on the other hand, up to the port of the directional control valve 74, the passage of which latter is closed since there is no control of the wheel brakes. Therefore, the control pressure port of the directional control valve 73 is not pressurized and the passage of this directional control valve is hence open.

As a result of the shift of the booster piston 40, pressure fluid is displaced from the first chamber 27 of the pressure fluid chamber 26 via the line 119, 120 and the open valve passage of the directional control valve 73 to the second chamber 28 of the pressure fluid chamber 26. These two chambers 27, 28 constitute a hydraulic system; a pressure fluid volume is displaced out of the chamber 27 into the chamber 28, the said volume being determined by the axial shift of the booster piston 40 and by the circular ring-shaped surface $F_2-F_1$; at the same time, a pressure fluid volume which is determined by the shift of the booster piston 40 and by the circular ring-shaped surface $F_1-F_3$ is displaced out of the chamber 27 via the check valve device formed by the sleeve 58 into the pressure fluid chamber 25. This displacement of pressure fluid into the pressure fluid chamber 25 causes a quicker axial shift of the floating piston 54 in comparison to the shift of the booster piston 40. After the brakes have been applied, the braking pressure build-up takes place in the wheel brake cylinders of the individual wheels in a known manner.

In this operating state, the following conditions will result at the double valve assembly: via the lines 116 and 117, the pressure propagates from the pressure chambers 24 and 25 into the pressure fluid chambers 92' and 92; the valve closure members 90' and 90 move into abutment on their associated valve seats 91' and 91. Since no pressure is prevailing at the pressure fluid port 95 due to the closed valve 74, the valve seat elements 86, 86' are caused by the spring force of the springs 88, 88' to remain in abutment on the stop 84, 84'; the valve passages in the valve seat elements 86, 86' are closed, since both the pressure fluid port 96' and the pressure fluid port 96 are unpressurized.

Braking action with slip control will now be described. In the event of energization of one of the solenoid valves 18 to 21 in response to a command of the control electronics, the directional control valve 74 will assume its open position; via the line 111, 112, the dynamic pressure is supplied to the control pressure port of the directional control valve 73 and closes said; simultaneously, the dynamic pressure is delivered via the pressure fluid port 95 into the pressure fluid chamber 100 of the double valve 70. This causes the valve seat elements 86 and 86' to shift together with the valve closure members 83 and 83' in opposition to the spring force of the compression springs 88 and 88' in the direction of the stops 85 and 85'; as the valve closure members 90 and 90' bear against the valve seats 91 and 91', the valve closure members 83 and 83' will abut on the extensions 94 and 94' thus causing the valve passages in the valve seat elements 86 and 86' to open. As a result, pressure fluid under dynamic pressure is fed, on the one hand, from the booster chamber 39 via the line 110, the directional control valve 74, the line 111, the pressure fluid port 95, the open valve passages 83, 86 and 83', 86' via the pressure fluid port 96' via the line 115 and the sleeve 56 designed as check valve device into the pressure chamber 24 of the brake circuit II; on the other hand, pressure fluid is fed via the pressure fluid port 96, the line 118, the check valve 71, the first chamber 27 and the sleeve 58 designed as check valve device into the pressure fluid chamber 25 of the brake circuit I. Pressurization of the wheel brake cylinders is possible in both brake circuits. As the directional control valve 73 is closed, the second chamber 28 is shut off so that the pedal 29 remains in its position.

It is now assumed that one of the two brake circuits I, or II, for instance the brake circuit II, fails. In the event of braking without slip control, the directional control valve 74 and the directional control valve 72 are closed, the directional control valve 73 is open, the pressure fluid port 95 of the double valve 70 is unpressurized, the pressure fluid chamber 92' is unpressurized. As a result of the spring force 87', the control element 89' abuts on the stop 93', and the associated valve passage 90, 91' is open so that the pressure fluid chambers 101' and 102' are connected to the supply reservoir 41. The valve passage at the valve seat element 86' is closed, the valve seat element 86' abuts on the stop 84' due to the spring force of the spring 88'. Braking action is possible with the still intact brake circuit; the details can be taken accordingly from the preceding explanations. These conditions apply analogously also upon failure of the brake circuit I.

If one brake circuit, e.g. brake circuit II, fails during slip control, the following conditions will ensure: The directional control valve 74 is open, the directional control valves 72 and 73 are closed, the dynamic pressure of the booster chamber 39 is prevailing at the pressure fluid port 95 of the double valve 70; the pressure fluid chamber 92' is unpressurized so that the control elements 89' abuts on the stop 93'. Because of the pressure prevailing in the pressure fluid chamber 100, the valve seat element 86' together with the valve closure member 83' are shifted until abutment on the stop 85'; the valve passage in the valve seat element 86' remains closed, since the extension 94' is still at a distance from the valve closure member 83'. Advantageously, this cuts off the introduction of pressure fluid into the defect brake circuit II through the valve passage in the valve seat element 86'. Braking is possible further in the still intact circuit I; details can be gathered from the preceding explanations. These conditions apply analogously also upon failure of the brake circuit I.

It is now assumed that the auxiliary energy supply system fails. The control pressure ports of both directional control valves 72 and 73 are unpressurized; both valves are in their open position. The two chambers 27 and 28 are hydraulically connected one to the other and, via the open valve 72 and the line 114, to the supply reservoir 41 so that pressure fluid is displaced out of the pressure fluid chamber 26 into the supply reservoir 41. Inventively, there results ease of slidability of the pedal and a braking pressure build-up at the wheel brake cylinders which are in communication with the associated pressure fluid chambers 24 and 25. In this respect, the function shall be dealt with briefly once more. As has already been described in detail hereinabove, in the state of the auxiliary energy supply system 3 being intact, the booster piston 40 has an effective area $F_1$ which displaces a specific volume when shifting axially. This area $F_1$ is composed of the area $F_3$ confining the pressure fluid chamber 25 as well as of an area portion $F_1-F_3$ which considers the pressure fluid volume flowing into the chamber 25 via the sleeve 58. Upon failure of the auxiliary energy supply system 3, however, the pressure fluid volume which results from the circular ring-shaped area $F_1-F_3$ and from the shift of the booster piston 40 will displace to the supply reservoir 41 so that the booster piston 40 will merely comprise an effective area $F_3$ which is smaller than the effective area $F_1$. Accordingly, in accordance with the present invention, it is possible to attain (with a smaller effective area and a greater displacement travel of the booster piston 40 and with less pedal force) the deacceleration of 30% required upon failure of the auxiliary energy supply system 3.

What is claimed is:

1. A pressure-fluid-operable vehicle brake system in which the pressure buildup in a master brake cylinder is augmented by an auxiliary energy source the latter of which is susceptible to failure, said brake system comprising, in combination:
   a master cylinder having a cylinder housing forming a pressure fluid chamber;
   a brake-actuated movable piston slidably mounted in said chamber of said housing, said movable piston having a stepped configuration including a first end portion defining a first piston area which is larger than a second end portion defining a second piston area and wherein said chamber is divided into first and second chambers respectively enclosing said first and second end portions of said movable piston and wherein said first piston area normally provides the effective area of said movable piston;
   an auxiliary energy source connected to said first chamber of said housing for further translating said movable piston in response to brake actuation;
   means for detecting a failure of said auxiliary energy source; and,
   means responsive to said means for detecting a failure for interconnecting said first and second chambers upon said failure of said auxiliary energy source wherein the effective area of said movable piston reduces to said second piston area.

2. The brake system according to claim 1 wherein said means responsive to said means for detecting includes a normally open valve, first and second main ports respectively connected to said first and second chambers and having a control chamber connected to said auxiliary energy source which closes said normally open valve in response to said auxiliary energy source.

3. The brake system according to claim 1, wherein said movable piston includes a floating piston mounted within said second end portion of said movable piston which defines said second piston area.

* * * * *